(12) United States Patent
Evans et al.

(10) Patent No.: US 7,698,342 B1
(45) Date of Patent: Apr. 13, 2010

(54) FIELD-LEVEL SEARCH TOOL

(75) Inventors: Rachel L. Evans, San Diego, CA (US);
Matthew G. Rice, San Diego, CA (US);
Leslie A. Skelly, San Diego, CA (US);
John A. Dryden, San Diego, CA (US);
Ronald A. Schaefer, Oceanside, CA (US); Mary Lou Cassell, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 336 days.

(21) Appl. No.: 11/807,016

(22) Filed: May 25, 2007

(51) Int. Cl.
*G06F 7/00* (2006.01)
*G06F 17/30* (2006.01)

(52) U.S. Cl. ........................ 707/755; 707/803

(58) Field of Classification Search ................ 707/2–5, 707/1, 100, 102
See application file for complete search history.

(56) References Cited

U.S. PATENT DOCUMENTS

| | | | |
|---|---|---|---|
| 5,704,029 A * | 12/1997 | Wright, Jr. | ................ 715/223 |
| 2002/0111958 A1 * | 8/2002 | Hartman et al. | ............. 707/200 |
| 2002/0178153 A1 * | 11/2002 | Nishioka et al. | ................ 707/3 |
| 2003/0063136 A1 * | 4/2003 | J'maev | ................... 345/864 |
| 2004/0205019 A1 * | 10/2004 | Painter et al. | ................ 705/38 |
| 2005/0080775 A1 * | 4/2005 | Colledge et al. | ............... 707/3 |
| 2005/0102283 A1 * | 5/2005 | Anderson et al. | ............. 707/4 |
| 2006/0038812 A1 * | 2/2006 | Warn et al. | ................... 345/419 |
| 2006/0098899 A1 * | 5/2006 | King et al. | ................... 382/305 |
| 2008/0109429 A1 * | 5/2008 | Petrin | ............................ 707/6 |

OTHER PUBLICATIONS

Intuit TurboTax Premier 2005 (Mac & PC), CNET Reviews, http://reviews.cnet.com/4505-6405_7-31624531.html, Nov. 25, 2005, 8 pages.

* cited by examiner

*Primary Examiner*—Wilson Lee
*Assistant Examiner*—Angela M Lie
(74) *Attorney, Agent, or Firm*—Osha • Liang LLP (57) ABSTRACT

A method for searching involving receiving a search term and obtaining a related word based on the search term to generate a search criteria, searching forms for the search criteria, identifying a topic associated with a field within a form based on the search criteria, and presenting the field within the form associated with the topic.

24 Claims, 6 Drawing Sheets

FIELD-LEVEL SEARCH TOOL

BACKGROUND

Consumers constantly deal with complex events such as filing taxes, submitting medical reports, paying real estate fees, and applying for financial aid. Each of these events require submission of data related to the consumer in one or more forms (i.e., any physical or virtual documents or templates that require input, such as text input, selections, or any other suitable method of submitting information).

Generally, forms have multiple sections, pages, and/or fields that require completion by a user. Certain portions of the forms may be relevant to a particular user, whereas other portions may not be relevant. Further, the relevance of particular portions may be based on responses to prior input.

In order to guide a user through multiple forms, sections, pages and/or fields, some software applications provide an "interview." An interview corresponds to a set of fields within multiple sections presented to a user in a predetermined order. Based on the user input collected for the fields, future questions and/or sections are determined to be relevant and are presented.

To find a particular topic within a set of forms or within an interview, a search may be performed for a topic. In response, the beginning of a form or a section is presented that matches the search term entered. Thereafter, to find the relevant topic, the particular form or interview section must be explored to reach the specific topic.

SUMMARY OF INVENTION

In general in one aspect, the invention relates to a method for searching. The method comprises receiving a search term and obtaining a related word based on the search term to generate a search criteria, searching a plurality of forms for the search criteria, identifying a topic associated with a field within a form of the plurality of forms based on the search criteria, and presenting the field within the form associated with the topic.

In general, in one aspect, the invention relates to a system for searching. The system comprises a data repository comprising a plurality of words and a plurality of forms; a management engine, comprising functionality to obtain a related word based on a search term from the plurality of words to generate a search criteria, search the plurality of the forms for the search criteria, and identify a topic and a field within a form of the plurality of forms based on the search criteria, where the field within the form is associated with the topic; and an interface, comprising functionality to receive the search term, and present the field of the form associated with the topic.

In general, in one aspect, the invention relates to a computer readable medium comprising instructions for searching. The instructions comprising functionality for receiving a search term and obtaining a related word based on the search term to generate a search criteria, searching a plurality of forms for the search criteria, identifying a topic associated with a field within a form of the plurality of forms based on the search criteria, and presenting the field within the form associated with the topic.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for searching for fields within forms. Specifically, embodiments of the invention allow for searching using a search criteria to identify a topic associated with a field within a form.

Figure 1:
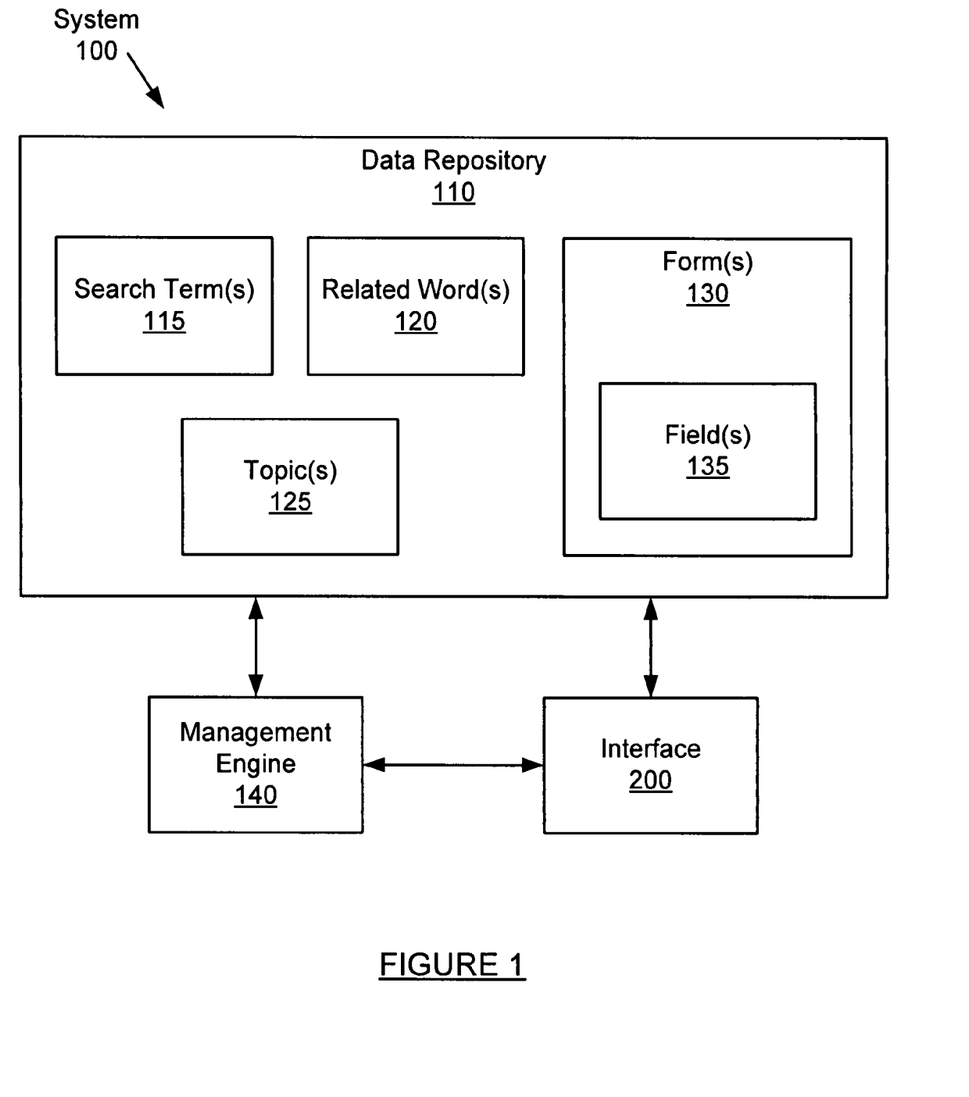
FIG. 1 shows a diagram of a system for searching forms in accordance with one or more embodiments of the invention.

FIG. 1 shows a system (100) in accordance with one or more embodiments of the invention. As shown in FIG. 1, the system (100) includes a data repository (110), a management engine (140), and a interface (150). Each of these components is described below and may be located on the same device (e.g., a server, mainframe, desktop PC, laptop, PDA, television, cable box, satellite box, kiosk, telephone, mobile phone, etc.) or may be located on separate devices coupled by a network (e.g., Internet, Intranet, Extranet, Local Area Network (LAN), Wide Area Network (WAN), etc.), with wire and/or wireless segments.

In one or more embodiments of the invention, the system (100) is implemented using a client-server topology. The system (100) itself may be an enterprise application running on one or more servers, and in some embodiments could be a peer-to-peer system, or resident upon a single computing system. In addition, the system (100) is accessible from other machines using one or more interfaces (e.g. interface (150), web portals, or any other tool to access the system). In one or more embodiments of the invention, the system (100) is accessible over a network connection (not shown), such as the Internet, by one or more users. Information and/or services provided by the system (100) may also be stored and accessed over the network connection.

In one or more embodiments of the invention, the data repository (110) includes functionality to store search term(s) (115), related word(s) (120), topic(s) (125) and form(s) (130). In one or more embodiments of the invention, access to the data repository (110) is restricted and/or secured. As such, access to the data repository (110) may require authentication using passwords, secret questions, personal identification numbers (PINs), biometrics, and/or any other suitable authentication mechanism. Those skilled in the art will appreciate that elements or various portions of data stored in the data repository (110) may be distributed and stored in multiple data repositories. In one or more embodiments of the invention, the data repository (110) is flat, hierarchical, network based, relational, dimensional, object modeled, or structured otherwise. For example, data repository (110) may be maintained as a table of a SQL database. In addition, data in the data repository (110) may be verified against data stored in other repositories.

Continuing with FIG. 1, in one or more embodiments of the invention, the search term (115) shown as stored in the data repository (110) corresponds to a word(s) entered by a user using an interface (e.g., interface (150)) or obtained from another source to search for a topic(s) (125) within a form(s) (130). A search term (115) may include (but is not limited to) complete words, incomplete words, misspelled words, numbers, sentences and/or symbols. While shown in FIG. 1 as stored in a single repository, one skilled in the art will appreciate that each portion of the data may be located in one or more data repositories (e.g., data repository (110)). For example, the search terms may be distributed across multiple servers. Alternatively, the search term (115) may not be stored in a data repository and used immediately upon receipt from a user.

In one or more embodiments of the invention, the search term (115) is used to obtain a related word(s) (120) and/or to generate a search criteria (not shown). The related word(s) (120) shown as stored in the data repository (110) correspond to one or more words related to the search term (115). For example, a related word (120) may be a synonym of the search term (115), an antonym of the search term (115), part of the same form as the search term (115), a correct spelling of the search term (115), a different tense of the search term (115), a correct term for a search term (115) that is a misnomer, a correct term for a commonly misunderstood search term (115), part of a definition of the search term (115), an updated term for an earlier used search term (115), a completion of an incomplete search term (115), a portion of the search term (115), or related in other relevant manner to the search term (115). The related words (120) may be stored with the corresponding search terms (115) in a spreadsheet, in a relational database, or in any other suitable manner. The following table of examples, which in no way is intended to limit the invention, includes related words which may be defined for search terms used to search tax forms.

| Search Terms | Related Words |
|---|---|
| Adop | Adoption, Adopted |
| Deductible Expense | Credit, Deductible, Expense |
| Pill | Birth Control |
| Mortgage Payment | Mortgage Interest Deduction |
| Farming Tax | Farmer's Tax |
| Pensions | Pension, Annuity, Annuities |
| Children | Child Tax Credit |

Continuing with FIG. 1, in one or more embodiments of the invention, a related word (120) for a search term (115) may be defined by an administrator, an industry professional, a user, a software application, a business, a governmental entity, or any other entity with information regarding the search term (115). For example, an industry professional in the medical industry may submit relevant related words for search terms commonly known or used by patients. For example, consider a scenario involving the auto industry, where a mechanic may enter related words for car parts corresponding to search terms commonly known by drivers. The search terms "car brakes" may be associated with related words, entered by the mechanic, such as brake pads, brake shoes, brake discs, brake drums, brake springs, brake rods, or any other words related to car brakes. Another example, may involve related words applicable to the tax industry, where a tax professional may associate the search terms "education deduction" with related words "education credit."

In one or more embodiments of the invention, the form(s) (130) shown as stored in the data repository (110) corresponds to any physical document, virtual document, and/or template that may be used to submit information. The form(s) (130) may be part of an interview (not shown), or may be presented as an interview in order of sections within a form (130). Although shown on a single data repository (i.e., data repository (110)), portions of the form(s) (130) corresponding to one or more interviews may be distributed across multiple data repositories. The form(s) (130) includes fields (135), which correspond to text fields, check boxes, radio buttons, drop down menus, selections, or any other component used to enter input. The form(s) (130) may also include metadata that provides information about the form(s) (130) such as a list of fields (135) contained within the form, the relevant topics within the form, data related to prior versions of the form(s) (130), and/or relations between different fields that may be used to present the form in an interview format. For example, metadata associated with a form to complete a tax return may indicate that an Internal Revenue Service W-2 document is related to income information necessary for a field within a the tax form. Another instance of metadata for the tax form may indicate whether the income levels for which a section within the form is relevant. Other than tax forms, examples of form(s) (125) may include (but are not limited to) medical forms, insurance forms, real estate forms, budget forms, license forms, letters, renewal forms, complaint forms, and/or financial aid forms.

In one or more embodiments of the invention, the topic(s) (125) shown as stored in the data repository (110) corresponds to the name of a field(s) (135), section (not shown), and/or form(s) (130). The topic(s) (125) may correspond to a field(s) (135) within a section of form(s) (130) or within a section of an interview (not shown). The topic(s) (125) may be generated based on metadata associated with the form(s) (130) that identify the name and/or subject matter. Further, the topic(s) (125) may include a direct link to a corresponding field (135) within the form (130). An exemplary list of topics for a medical form may include (but not limited to) allergies, heart condition, age, blood type, medications, hearing, vision and/or any other relevant topics. Each of these topics may correspond to a field and/or section within the medical form into which a user may enter input.

Continuing with FIG. 1, in one or more embodiments of the invention, the management engine (140) corresponds to a process, software application, and/or computer system that includes functionality to generate a search criteria (not shown), and search forms (130) or interviews (not shown) for a topic (125) based on the search criteria. In one or more embodiments of the invention, the search criteria is generated based on the search term(s) (115) and/or the related word(s) (120). The search criteria may simply correspond to a collection of the search term(s) (115) and/or related word(s) (120) associated with the search term(s) (115). Alternatively, the search criteria may be generated based on an analysis of the search term(s) (115) and the related word(s) (120). For example, consider the scenario where the search term entered by a user is known to be a misnomer and the related word, defined by an industry professional, is the intended term. In this case, the search criteria may include only the related words associated with the search term, rather than the search term itself. In addition, the search criteria may include different conjugations of the search term(s) (115) and/or the related word(s) (120). The search criteria may also be generated based on prior searches and selections by a user. For example, if it is common for patients to use the search term "physical" and select the topic "routine checkup" from the search results, the search criteria may include "checkup" for a search term which includes the word "physical."

In one or more embodiments of the invention, the management engine (140) includes functionality to search forms (130) and identify topics (125) associated with one or more fields (135) within the forms (130) based on the search criteria. In one or more embodiments of the invention, the management engine (140) may identify fields (135) based on the search criteria and then determine topics (125) (i.e., title of the field, keywords associated with the field, section headers or any other topics) related to the field. Alternatively, the management engine (140) may search a list of known topics (125) to determine a relevant topic (125) for the search criteria and thereafter identify fields (135) associated with the relevant topics. Further, the management engine (140) includes functionality to use any known search methods based on the search criteria.

Continuing with FIG. 1, the interface (200) corresponds to any sort of interface adapted for use to access the system (100) and any services provided by the system (100) in accordance with one or more embodiments of the invention. The interface (200) may be a web interface, graphical user interface (GUI), command line interface, or other interface accessible through a computer system.

In one or more embodiments of the invention, the interface (200) includes one or more web pages that can be accessed from a computer with a web browser and/or internet connection. Alternatively, the interface (200) may be an application that resides on a computing system, such as personal computers (PCs), mobile phones, personal digital assistants (PDAs), and/or other digital computing devices of the users, and that communicate with the system (100) via one or more network connections and protocols. Regardless of the architecture of the system, communications between the system (100) and the interface (200) may be secure, as described above.

The interface (200) includes functionality to allow a user (or an automated equivalent) to enter a search term and be presented with a list of topics (135) from which a user makes a selection, as further discussed below in the discussion of FIG. 2. The interface (200) also includes functionality to present a field (135) within a form (130) obtained from the data repository (110) or another source (e.g., the world wide web, and/or a network resource) corresponding to a topic (125) selected from the search results generated by the management engine (140). The interface (200) may also present multiple fields within the form (130) with an indication of the field (135) corresponding to the selected topic (125). Alternatively, the interface (200) may include functionality to directly present the user with a field (135) within a form (130) without presenting a list of the search results generated by the management engine (140) (e.g., a search result selected for the user or if a single search result is found). The interface (200) may also present a field (135) within a section (e.g., middle of the section, end of section, etc.) of a form (130) or within a section (e.g., middle of the section, end of section, etc.) of an interview (not shown).

Figure 2:
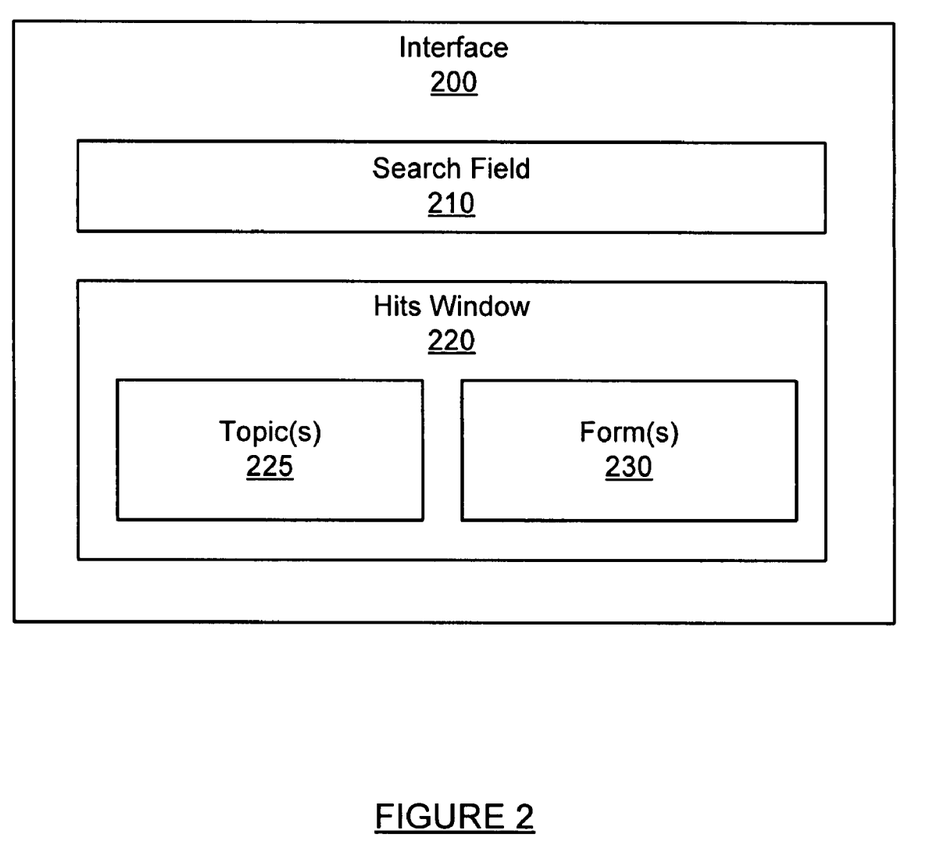
FIG. 2 shows an interface for searching forms in accordance with one or more embodiments of the invention.

FIG. 2 shows an interface (200) for searching forms in accordance with one or more embodiments of the invention. As shown in FIG. 2, the interface (200) includes a search field (210) and a hits window (230). In one or more embodiments of the invention, the search field (210) is configured to accept search terms from a user. The search field (210) may correspond to any implementation of an input tool including, but not limited to, textual fields, check boxes, radio buttons, file imports, web downloads, or any other applicable implementation of obtaining input.

In one or more embodiments of the invention, the hits window (220) corresponds to a display of the search results (i.e., topic(s) (225) and the corresponding form (230)) based on the search terms entered in the search field (210). In one or more embodiments of the invention, the hits window (220) is updated while input (i.e., the search term) is being entered in the search field (210). In another embodiment of the invention, a user completes entering the input in the search field (210) before the search results are displayed.

In one or more embodiments of the invention, the search results are displayed with the portion of the search criteria used in determining the search result. For example, the search terms "mortgage payment" that results in a topic "mortgage interest deduction," may be displayed as "mortgage, mortgage interest deduction" indicating that the term "mortgage" was used to identify the topic "mortgage interest deduction." Another example may involve the search terms "house payment." In this example, the related words "mortgage interest" may used to generate the search criteria and identify the topic "mortgage interest deduction." Accordingly, the search results may display "mortgage interest, mortgage interest deduction" identifying "mortgage interest" as the terms that actually resulted in identifying the topic "mortgage interest deduction."

Figure 4:
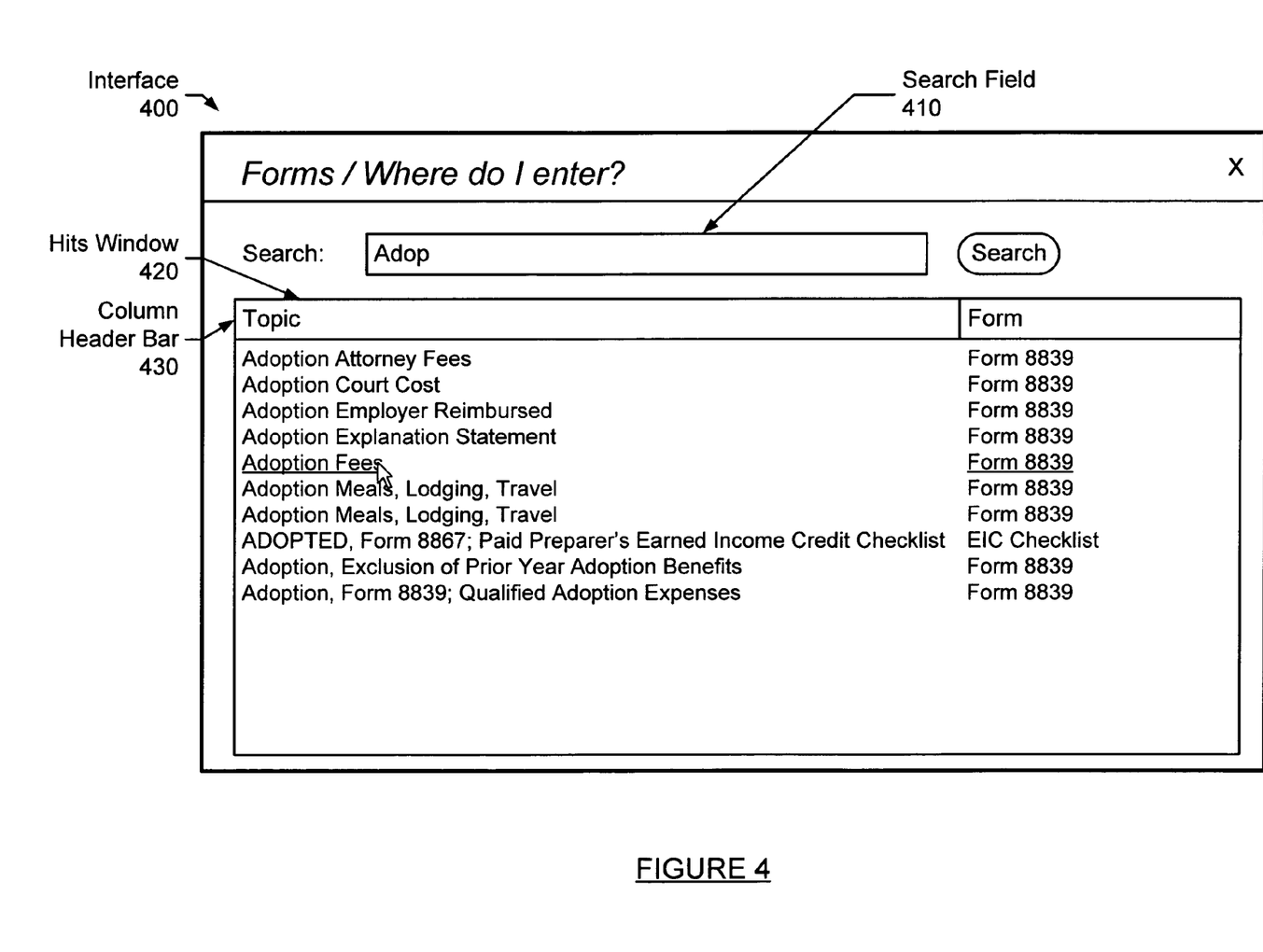
FIGS. 4-5 show examples of an interface for searching forms in accordance with one or more embodiments of the invention.
Figure 5:
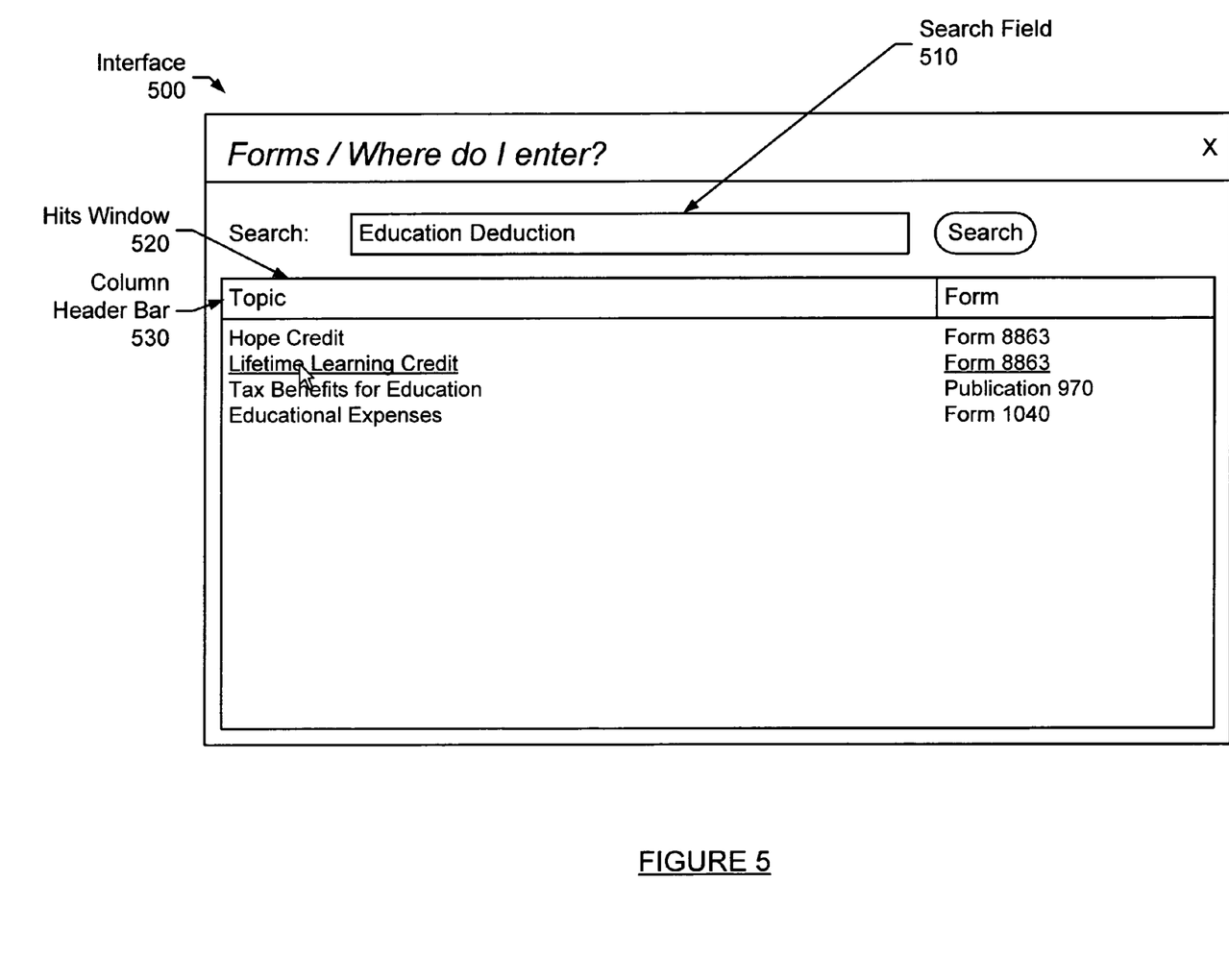

In one or more embodiments of the invention, the topic (225) corresponds to one or more fields in one or more sections/pages of the form (230). The topic (225) as used in relation to FIG. 2 is essentially the same as topic (125). The topic (225) may identify the name of a field, or alternatively, may identify the general subject of a field and/or section in the form (230). In addition, the topic (225) may include a link that allows a user to directly access an associated field within the form (230), as shown in FIGS. 4 & 5. The link may directly present the user with the field that is generally accessible only through the progression of an interview associated with the form. Alternatively, the topic (225) may link to a display of an editable version of the form (230) with the relevant field highlighted, shaded, selected, or identified in any other suitable manner.

In one or more embodiments of the invention, the form (230) corresponds to a title, symbol, and/or other representation of the form (e.g., form (130)) associated with the topic (225). If multiple forms (230) are associated with the same topic (225), then the topic (225) may be listed multiple times, once for each field and/or form associated with the topic. In one or more embodiments of the invention, the form (230) contains a link to the field within the form (230) associated with the topic (125) or, alternatively, the form (230) may contain a link to the entire form.

Figure 3:
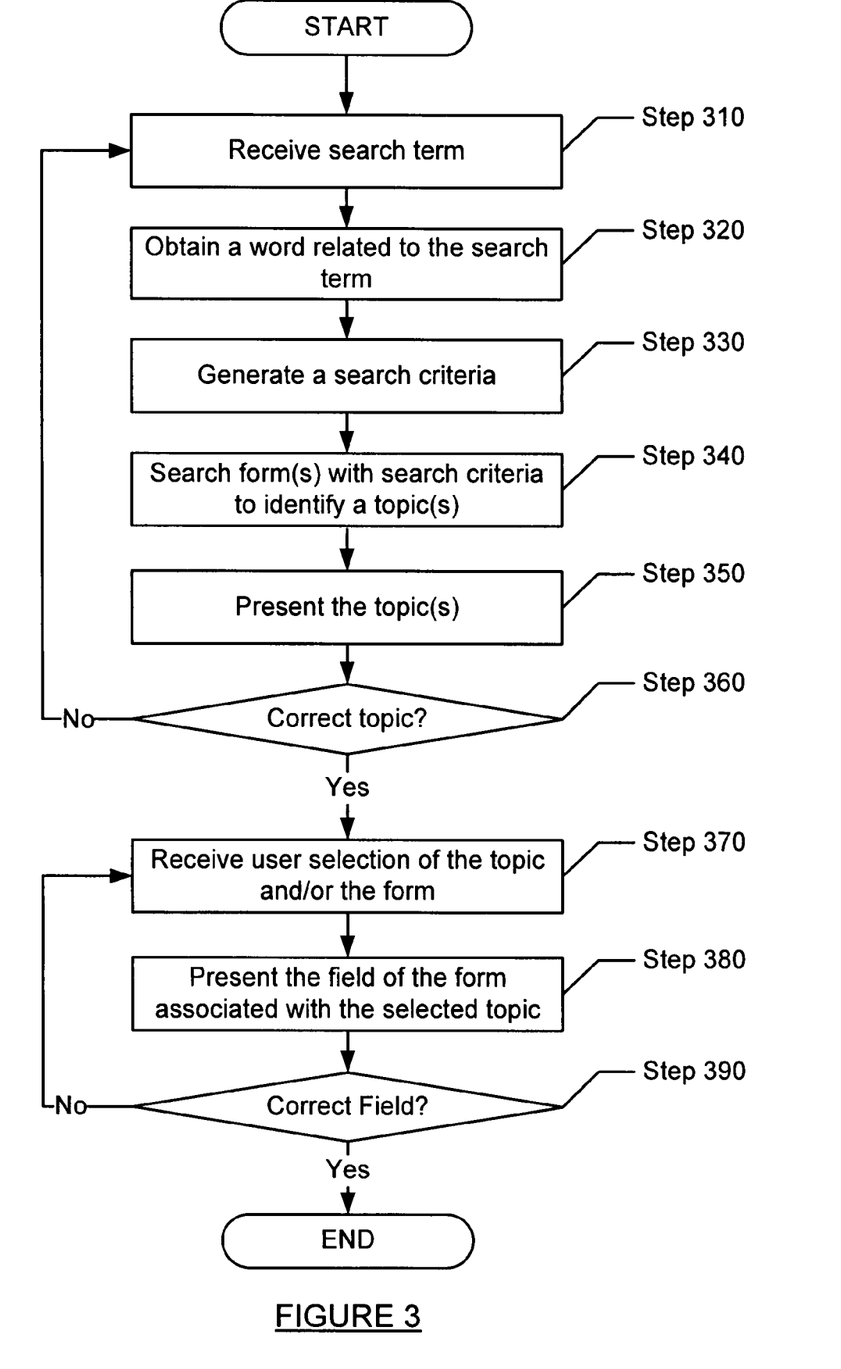
FIG. 3 shows a flow chart for searching forms in accordance with one or more embodiments of the invention.

FIG. 3 shows a flow chart for searching forms in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a search term(s) is received (Step 310) in accordance with one or more embodiments of the invention. The search term(s) may be received in any manner including (but not limited to) an interface, a website, a file import, web downloads, or in any other suitable manner. In one or more embodiments of the invention, one or more search term(s) are received from a user, a process, a software application, or any other source.

Next, one or more word(s) related to the search term(s) is obtained (Step 320). The related word(s) may be obtained from a data repository. For example, the search term may be used to query a database for all related words. If the search term is listed in the database with words that are related, the related words are returned. If the search term is not listed or no related words are available, the query may return a null value. In another embodiment of the invention, the search term may be used to perform a web search to determine all words related to the search term. In another embodiment of the invention, websites may be scraped to determine words related to the search term. In another embodiment of the invention, a user maintained spreadsheet that stores search terms and words related to the search terms may be accessed to obtain the related words. Alternatively, in one embodiment of the invention, Step 320 may be skipped.

In one or more embodiments of the invention, the related words may be obtained from administrators, industry professionals, users, processes, software, or any other source with information about the search term. In another embodiment of the invention, a related word(s) may be obtained based on past searches. For example, words from topics selected previously for a search term(s) may be used as related words for a search with similar search term(s).

In one or more embodiments of the invention, a search criteria is generated using the search term(s) and/or the related word(s) (Step 330). In one or more embodiments of the invention, the search criteria is generated by creating a list of the search term(s) and the related word(s). In another embodiment of the invention, a search term and/or a related term may be modified by tense, plurality, or any other grammatical modification to generate a search criteria. For example, the search term "adop" may be used to generate search criteria including adop, adopted, adoption, adopting, or any other suitable modification. In another embodiment of the invention, a portion of the search term and/or the related words may be used. For example, for the search terms and related words: "how do I deduct a mortgage payment," and "mortgage interest credit," respectively, the search criteria "mortgage interest, credit, deductible" may be generated. In another embodiment of the invention, the search criteria may be generated by identifying matches between a search term (s), and/or a related word(s) with terms known in the industry.

Form(s) (including forms included in an interview) are then searched using the search criteria in order to identify a topic in accordance with one or more embodiments of the invention (Step 340). The form(s) may be searched by comparing search criteria with words within the form, the names of fields and/or sections within the form(s), the keywords associated with the form(s), the metadata associated with the form(s), the user defined descriptions associated with the form(s), the symbols associated with the form(s) or with any other data associated with the form. For example, data associated with the form may be tokenized and stored into a data structure and thereafter the search criteria may be compared to each node in the data structure in order to identify a match. Once a match in the form(s) is found, it may be identified directly as the topic, or alternatively the name of the section or field containing the match may be identified as the topic.

Next, the identified topic(s) is presented to the user as a search result in accordance with one or more embodiments of the invention (Step 350). The topic(s) may be presented using an interface (e.g., a graphical interface as shown in FIGS. 4 and 5). The identified topic(s) may also be exported to another application, displayed on a screen, posted on the internet, stored in data repository, printed for a file, sent to a mobile device over a network, or presented in any useful manner. In one or more embodiments of the invention, the topic(s) is presented with an identifier (e.g., a name or a symbol) of a form associated with the topic(s). For example, if the topic is allergies, the title of the corresponding medical form for an allergic specialist examination may be listed. The topic and/or form identifiers that are presented may be embedded with a link that links to a field and/or section within a form associated with the topic, or to the form, respectively.

In one or more embodiments of the invention, a user determines whether the correct topic is presented (Step 360). The user may make this determination based on the topic and/or the form associated with the topic. If multiple topics are presented, the user may determine that one or more topics are correct or that no topic is correct. If the user determines that a correct topic is unavailable in the topics presented, the user may provide a different search term. However, if the user determines that a correct topic is available, the user may select the topic and/or the associated form. A user selection of the topic and/or the form may be received (Step 370) using any input including (but not limited to) a keyboard input, a mouse click, hovering over the topic, a text message, an e-mail message, or any other suitable input for indicating a selection.

Once a selection is received, a field within the form associated with the selected topic is presented (Step 380). The field may be presented in an interface, a printout, a display, a message, a data repository storage, or any other suitable medium through which the user can access the field. The field may be presented as part of a form and/or part of an interview. If the field is presented as part of a form or interview, an additional indicator may be presented to indicate the field corresponding to the selected topic. In one or more embodiments of the invention, Steps 350-370 may be skipped and a field may be presented directly based on the search from Step 340. For example, when only a single search result is available or the software application selects a search result (e.g., that best matches the search criteria).

In one or more embodiments of the invention, a user determines whether the correct field is presented (Step 390). The user may make this determination based on the field, section, and/or form presented. If the user determines that the field is incorrect, the user may go back and choose another topic and/or form to link to another field.

FIG. 4 shows an example of an interface (400) in accordance with one or more embodiments of the invention that is not intended to limit the invention. In this example, a user is searching for a field in a form associated with adoption. Accordingly, as the user is typing "adoption," into the search field (410), the interface displays matches based on a search criteria generated from the user entered term and words related to the user entered term. By the time the user enters the characters "adop," the related word "adoption" is found and a search criteria "adop," "adopted," "adoption," and "child" has been generated. Furthermore, a continuous search of the metadata associated with available forms (as the user types) results in ten separate hits displayed in the hits window (420). The column header bar (430) indicates that the topics and corresponding forms for the search term are listed in the hits window (420). The user reviews the hits in the hits window (430) and discovers the topic "adoption fees" in Form 8839, which is precisely what the user is seeking. Thereafter, the user selects the topic "adoption fees" and which links the user directly to a field (not shown) within Form 8839 associated with "adoption fees." Upon viewing the field highlighted within the form, the user thereafter determines that this is correct field.

FIG. 5 shows a second example of an interface (500) for filing taxes in accordance with one or more embodiments of the invention. In this example, a user is searching for tax related information related to education expenses incurred. As commonly misunderstood, the user refers to the education expenses as an "educational deduction" and enters "education deduction" into search field (510). Once the search term is completely entered, a database is queried for related words to find words related to "educational deduction." The related words "education credit," defined by a tax professional, are returned as a result of the query, along with data indicating that the "education deduction" is a common misnomer. As a result, a search criteria including the words "education" and "credit" is generated.

The search criteria is then used to perform a search of tax forms available through a network. Four topics are found to match the search criteria and displayed in the hits window (520). The user first selects "Publication 970" to learn about educational tax benefits. Upon reviewing "Publication 970", the user learns that there are two types of tax credits to help offset the cost of higher education by reducing the amount of income tax owed to the government. They are the Hope Credit and the Lifetime Learning Credit, also referred to as Education credits. The user also determines that the lifetime learning credit is the type of credit sought and therefore selects the "Lifetime Learning Credit" within "Form 8863." By selecting the "Lifetime Learning Credit" the user is taken immediately to the exact portion of Form 8863 addressing the relevant issue for the user (based on the search criteria).

Figure 6:
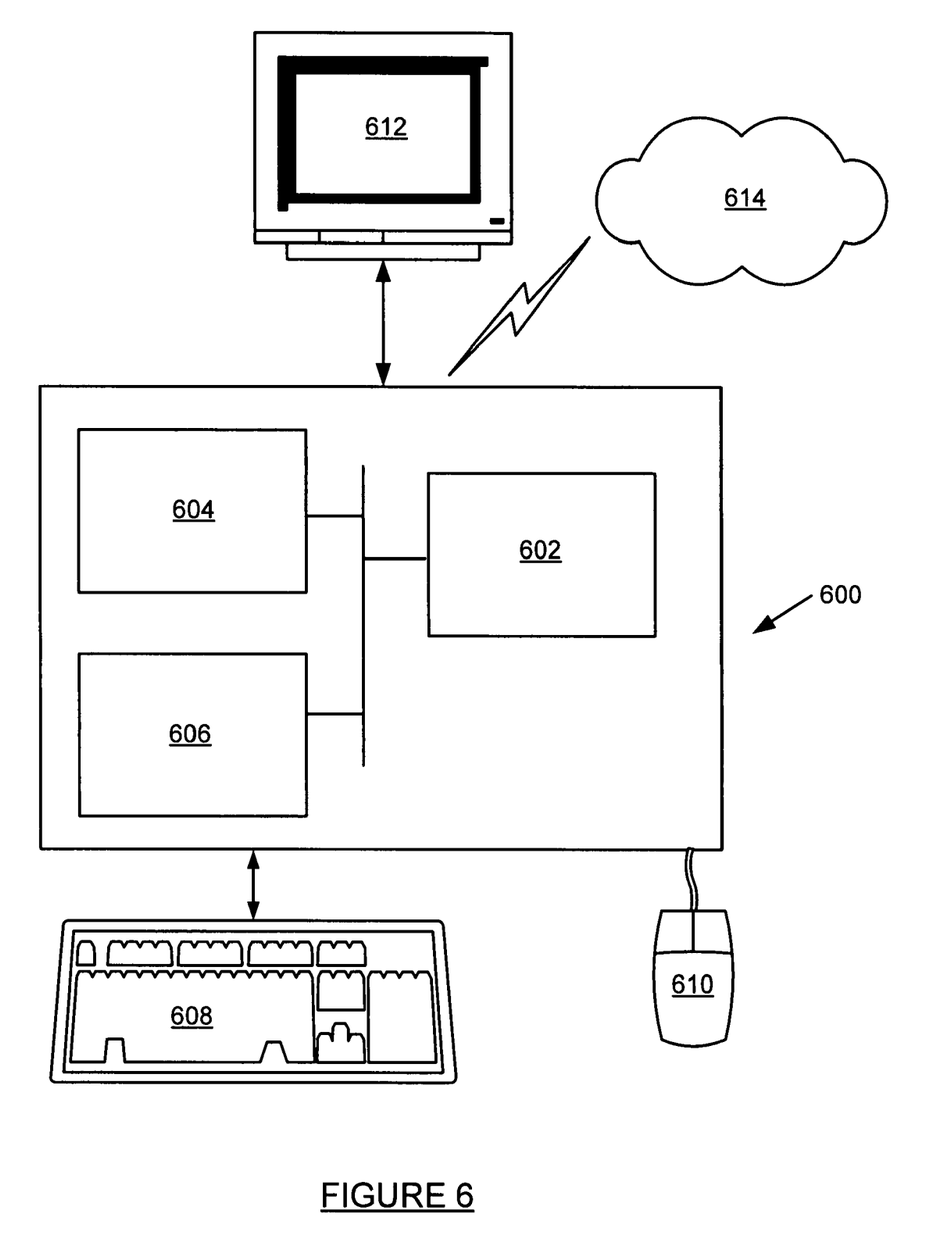
FIG. 6 shows an example of a system for searching forms in accordance with one or more embodiments of the invention.

The invention may be implemented on virtually any type of computer regardless of the platform being used. For example, as shown in FIG. 6, a computer system (600) includes a processor (602), associated memory (604), a storage device (506), and numerous other elements and functionalities typical of today's computers (not shown). The computer (600) may also include input means, such as a keyboard (608) and a mouse (610), and output means, such as a monitor (612). The computer system (600) is connected to a LAN or a WAN (e.g., the Internet) (614) via a network interface connection. Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., object store layer, communication layer, simulation logic layer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for completing a form, comprising:
   storing data associated with a plurality of forms into a data structure comprising a plurality of nodes corresponding to a plurality of fields in the plurality of forms;
   receiving a search term from a user and obtaining a related word based on the search term to generate a search criteria;
   searching, using a processor of a computer, the plurality of forms by comparing the search criteria to each of the plurality of nodes in the data structure to generate a match;
   identifying, using the processor of the computer, a field within the form of the plurality of forms based on the match and the data structure; and
   presenting the field within the form to the user for completing the form.

2. The method of claim 1, wherein identifying the field within the form comprises:
   identifying the match as a topic associated with the field within the form;
   presenting the topic associated with a link to the field within the form to the user for a selection; and
   receiving the selection from the user comprising the topic, wherein the field within the form is presented to the user using the link identified based on the selection.

3. The method of claim 1, further comprising:
   displaying a portion of the search criteria used to identify the topic and the form of the plurality of forms.

4. The method of claim 1, wherein the related word is a synonym.

5. The method of claim 1, wherein the related word is defined by an administrator.

6. The method of claim 1, wherein the related word is defined by at least one user.

7. The method of claim 1, wherein the search criteria comprises the search term and the related word.

8. The method of claim 1, wherein presenting the field within the form comprises displaying the field in an editable format.

9. A system for completing a form, comprising:
   a data repository comprising a plurality of words, a plurality of forms, and a data structure comprising a plurality of nodes corresponding to a plurality of fields in the plurality of forms;
   a management engine, comprising functionality to:
      store data associated with the plurality of forms into the data structure;
      obtain a related word based on a search term from the plurality of words to generate a search criteria;
      search the plurality of the forms by comparing the search criteria to each of the plurality of nodes in the data structure to generate a match; and
      identify a field within the form of the plurality of forms based on the match and the data structure; and
   an interface, comprising functionality to:
      receive the search term from a user; and
      present the field within the form to the user for completing the form.

10. The system of claim 9, wherein identifying the field within the form comprises:
    identifying the match as a topic associated with the field within the form;
    display the topic associated with a link to the field within the form to the user for a selection; and receiving the selection from the user comprising the topic, wherein the field within the form is presented to the user using the link identified based on the selection.

11. The system of claim 9, wherein the interface further comprising functionality to display a portion of the search criteria used to identify the topic and the form of the plurality of forms.

12. The system of claim 9, wherein the related word is a synonym.

13. The system of claim 9, wherein the related word is defined by an administrator.

14. The system of claim 9, wherein the related word is defined by at least one user.

15. The system of claim 9, wherein the search criteria comprises the search term and the related word.

16. The system of claim 9, wherein presenting the field within the form comprises displaying the field in an editable format.

17. A computer readable medium comprising instructions for completing a form, wherein the instructions comprising functionality for:
   storing data associated with a plurality of forms into a data structure comprising a plurality of nodes corresponding to a plurality of fields in the plurality of forms;
   receiving a search term from a user and obtaining a related word based on the search term to generate a search criteria;
   searching, using a processor of a computer, the plurality of forms by comparing the search criteria to each of the plurality of nodes in the data structure to generate a match;
   identifying, using the processor of the computer, a field within the form of the plurality of forms based on the match and the data structure; and
   presenting the field within the form to the user for completing the form.

18. The computer readable medium of claim 17, wherein identifying the field within the form comprises:
   identifying the match as a topic associated with the field within the form;
   presenting the topic associated with a link to the field within the form to the user for a selection; and
   receiving the selection from the user comprising the topic, wherein the field within the form is presented to the user using the link identified based on the selection.

19. The computer readable medium of claim 17, wherein the instructions further comprise functionality for displaying a portion of the search criteria used to identify the topic and the form of the plurality of forms.

20. The computer readable medium of claim 17, wherein the related word is a synonym.

21. The computer readable medium of claim 17, wherein the related word is defined by an administrator.

22. The computer readable medium of claim 17, wherein the related word is defined by at least one user.

23. The computer readable medium of claim 17, wherein the search criteria comprises the search term and the related word.

24. The computer readable medium of claim 17, wherein presenting the field within the form comprises displaying the field within the form, wherein the field is in an editable format.

* * * * *

UNITED STATES PATENT AND TRADEMARK OFFICE
CERTIFICATE OF CORRECTION

| | | |
|---|---|---|
| PATENT NO. | : 7,698,342 B1 | Page 1 of 1 |
| APPLICATION NO. | : 11/807016 | |
| DATED | : April 13, 2010 | |
| INVENTOR(S) | : Rachel L. Evans et al. | |

It is certified that error appears in the above-identified patent and that said Letters Patent is hereby corrected as shown below:

- In the claims, claim 10, column 10, line 66, the word "display" should read as -- displaying --.

Signed and Sealed this

Third Day of August, 2010

David J. Kappos
*Director of the United States Patent and Trademark Office*